United States Patent [19]

Trout et al.

[11] Patent Number: 5,498,015
[45] Date of Patent: Mar. 12, 1996

[54] BICYCLE STAND

[76] Inventors: Jerry J. Trout, 305 N. 9th St.; Paul G. Borthwick, 214 Rainbow Dr., both of Marshalltown, Iowa 50158

[21] Appl. No.: 413,606

[22] Filed: Mar. 30, 1995

[51] Int. Cl.$^6$ .................................................. B62H 1/02
[52] U.S. Cl. ........................... 280/293; 280/301; 211/22
[58] Field of Search ........................... 280/293, 294, 280/295, 296, 297, 298, 299, 300, 301, 302, 303, 304; 211/22; 248/137

[56] References Cited

U.S. PATENT DOCUMENTS

| | | | |
|---|---|---|---|
| 564,733 | 7/1896 | Beardsley | 211/22 |
| 594,373 | 11/1897 | Beardsley | 211/22 |
| 623,785 | 4/1899 | Hubbell | 211/22 |
| 2,805,860 | 9/1957 | Littig | 211/22 X |
| 3,724,844 | 4/1973 | Olmstead | 211/22 |
| 3,980,320 | 9/1976 | Marchello | 280/293 |

FOREIGN PATENT DOCUMENTS

| | | | |
|---|---|---|---|
| 1247112 | 2/1961 | France . | |
| 2466226 | 4/1981 | France | 211/22 |
| 0328453 | 8/1935 | Italy | 280/294 |
| 0002526 | 4/1897 | United Kingdom | 211/22 |
| 0417951 | 10/1934 | United Kingdom | 280/293 |
| 446974 | 5/1936 | United Kingdom . | |

*Primary Examiner*—Margaret A. Focarino
*Assistant Examiner*—F. Zeender
*Attorney, Agent, or Firm*—Zarley, McKee, Thomte, Voorhees & Sease

[57] ABSTRACT

A bicycle repair stand particularly well suited for tandem bicycles supports the bicycle from one side only by being connected to the crank arm assembly through the dust cap threads and/or the fixing bolt threads of the crank arm axle. A third embodiment includes the locking bolt of the stand being connected to a stand arm having a clamp at its outer end engaging a crank arm connected to the axle. In all embodiments the crank arm is allowed to fully rotate without interference from the stand. The stand post may be pivoted from a first position where the bicycle is mounted and dismounted from the stand to a second position where the adjacent wheel is raised off the ground.

8 Claims, 3 Drawing Sheets

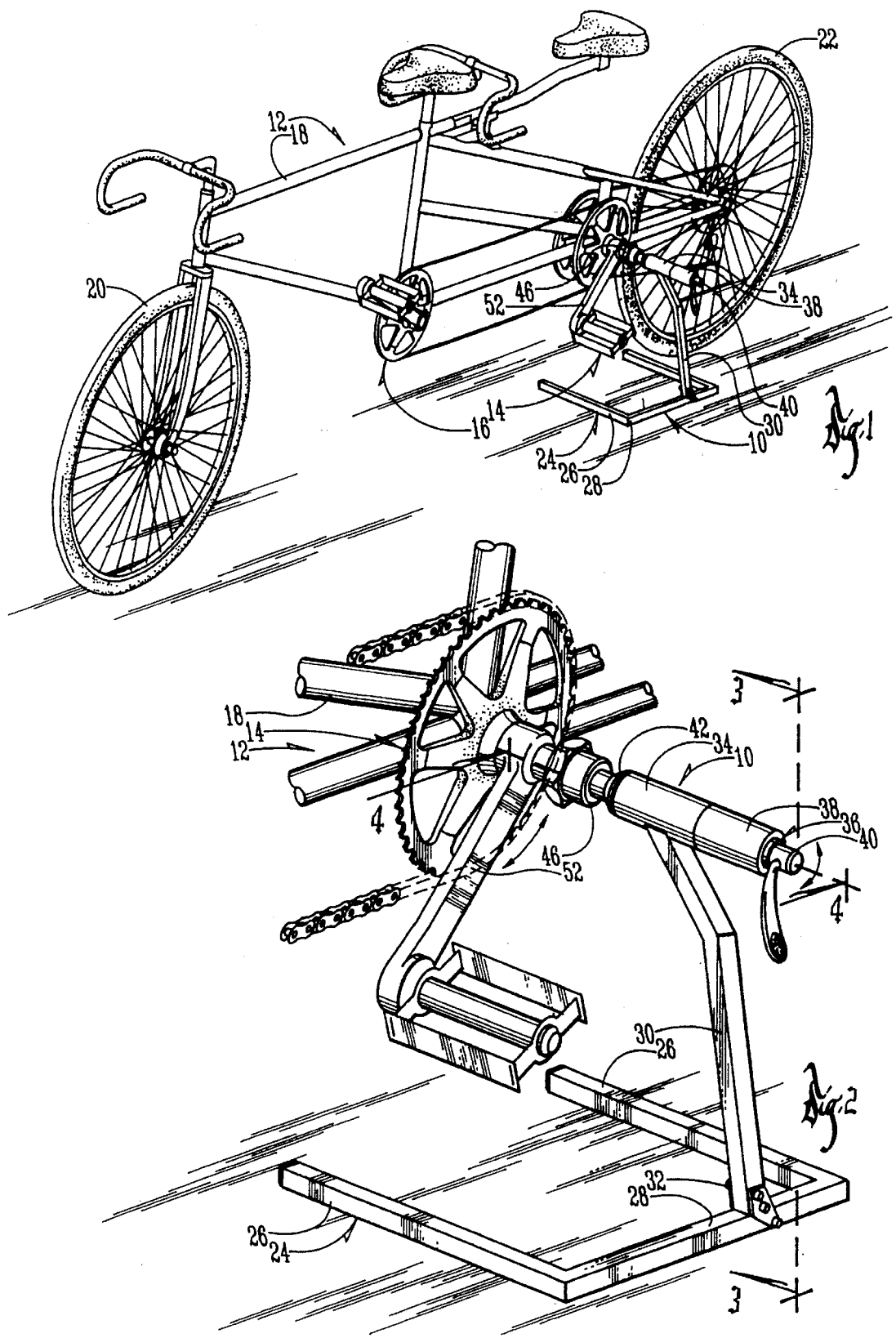

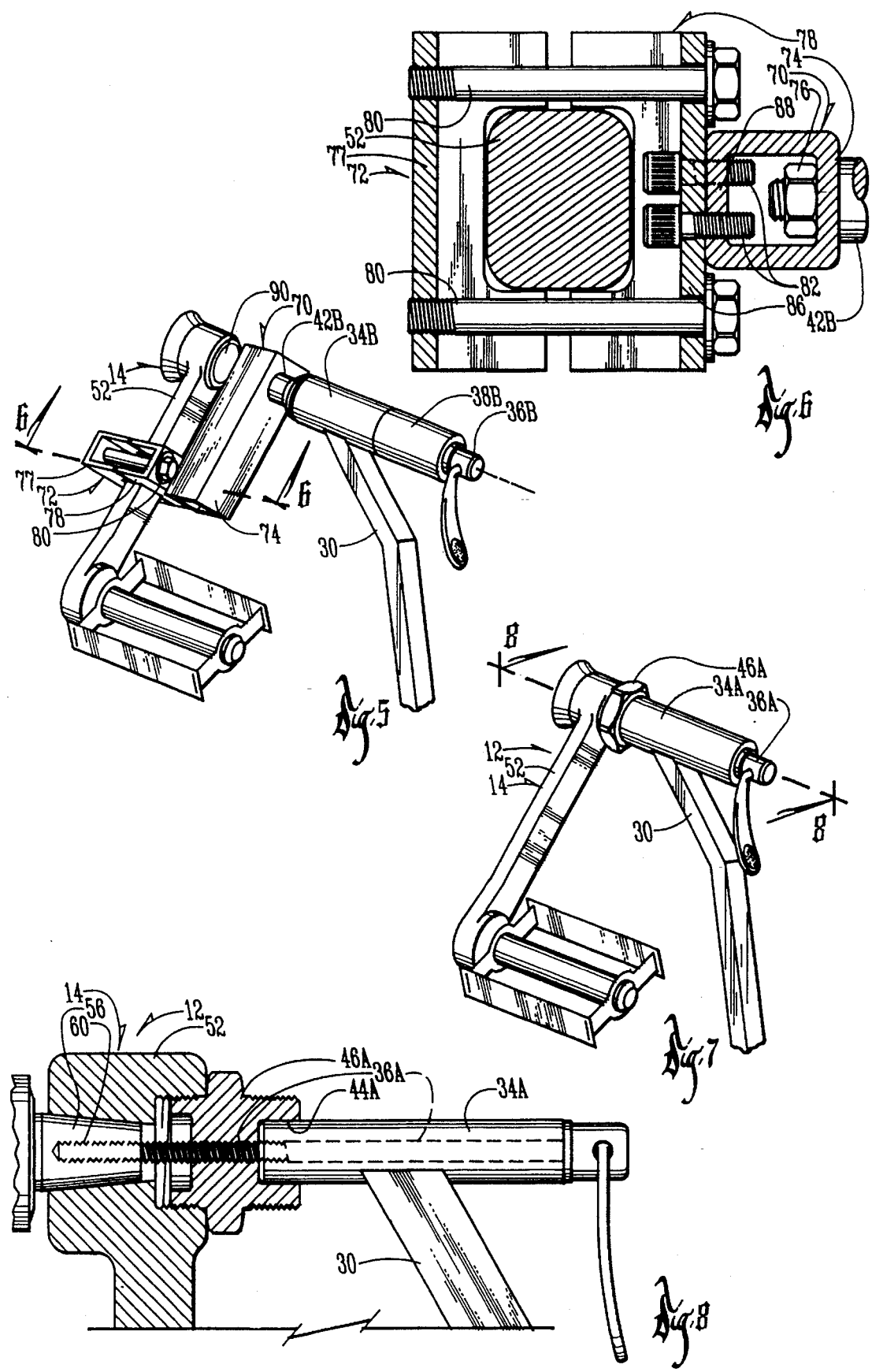

5,498,015

1

BICYCLE STAND

BACKGROUND OF THE INVENTION

Most stands for the repair and tuning of bicycles are complicated and expensive, or do not allow for full operation of the crank assembly.

A stand representative of the prior art is disclosed in Great Britain Patent 446,974, May 8, 1936. A U-shaped support is shown having oppositely disposed posts with pointed studs on their upper ends engaging the opposite ends of the crank arm axle. The stand further includes a stabilizing arm which has its upper end provided with a pin that engages in an opening in the sprocket wheel and over the chain stays of the bicycle, thus, preventing normal operation of the crank arm assembly.

It is thus seen that what is needed is a repair stand which is simple in construction, low in cost, and will support the bicycle and allow full operation of the crank arm assembly.

SUMMARY OF THE INVENTION

The repair stand of this invention is particularly well suited for tandem bicycles and is adapted to work with either the front or rear crank set. When used with the front crank set the front wheel is raised off the ground, leaving the rear wheel on the ground, and when used with the rear crank set the rear wheel is raised off the ground and the front wheel remains on the ground. The bicycle is fully stabilized in either case and the crank sets are fully operational. The stand includes an upstanding post which is pivotal between two positions. When the post is in the first position it may be locked to the crank assembly and when moved to the second position raises one wheel off the ground.

Three different embodiments of this invention are disclosed. The first has a lock means in the nature of an adapter on a bolt screwed into the threads normally used by a dust cap over the axle. The second embodiment has the bolt also threadably engaging the threads normally used by a fixing bolt in the axle. The third embodiment engages the axle operatively through the crank arm by a stand arm being clamped to the crank arm, and being rotatable about an axis coaxial with the crank assembly axle.

In all three embodiments the bicycle is supported by the stand engaging only one side of the bicycle.

DESCRIPTION OF THE DRAWINGS

FIG. 1 is a prospective view of a tandem bicycle supported on the bicycle stand of this invention.

FIG. 2 is an enlarged fragmentary perspective view of the bicycle stand engaging the crank arm axle of the bicycle.

FIG. 5 is a fragmentary perspective view of an alternate embodiment wherein the lock bolt includes an arm having a clamp at its outer end engaging the crank arm of the bicycle.

FIG. 6 is a cross-sectional view taken along line 6—6 in FIG. 5.

2

Figure 4:
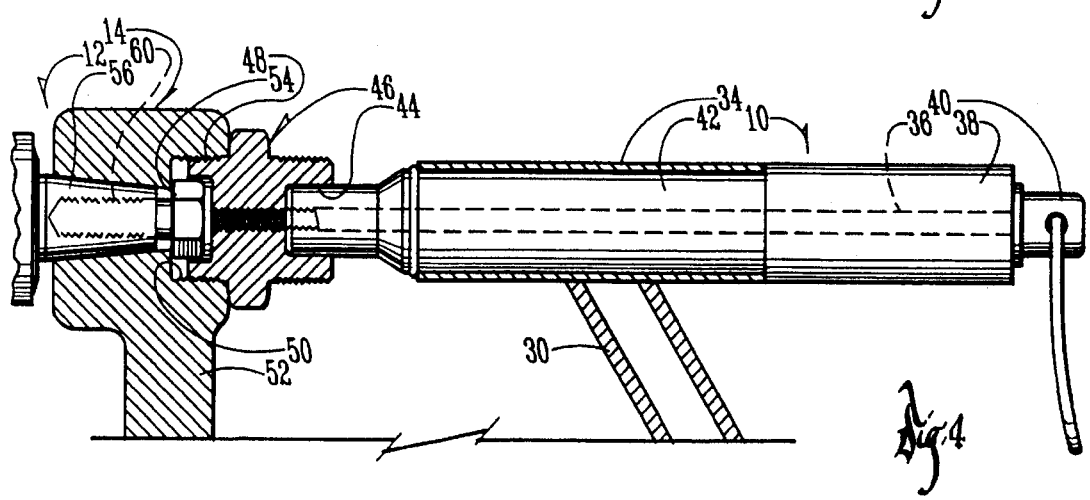
FIG. 4 is a cross sectional view taken along line 4—4 in FIG. 2, showing the adapter on the lock bolt being threadably connected to the dust cap threads on the crank arm.

FIG. 7 is a cross-sectional view similar to FIG. 4 but showing a further alternate embodiment wherein not only the adapter is threadably attached to the dust cover threads, but the lock bolt is threadably engaging the fixing bolt threads in the crank arm axle.

FIG. 8 is a cross-sectional view taken along line 8—8 in FIG. 7.

DETAILED DESCRIPTION

The bicycle stand of this invention is referred generally by the reference numeral 10 in FIG. 1 and is shown supporting a tandem bicycle 12 through engagement with a rear crank set 14, which operates in conjunction with a front crank set 16. The bicycle frame 18 includes a front wheel 20 and a rear wheel 22.

Figure 3:
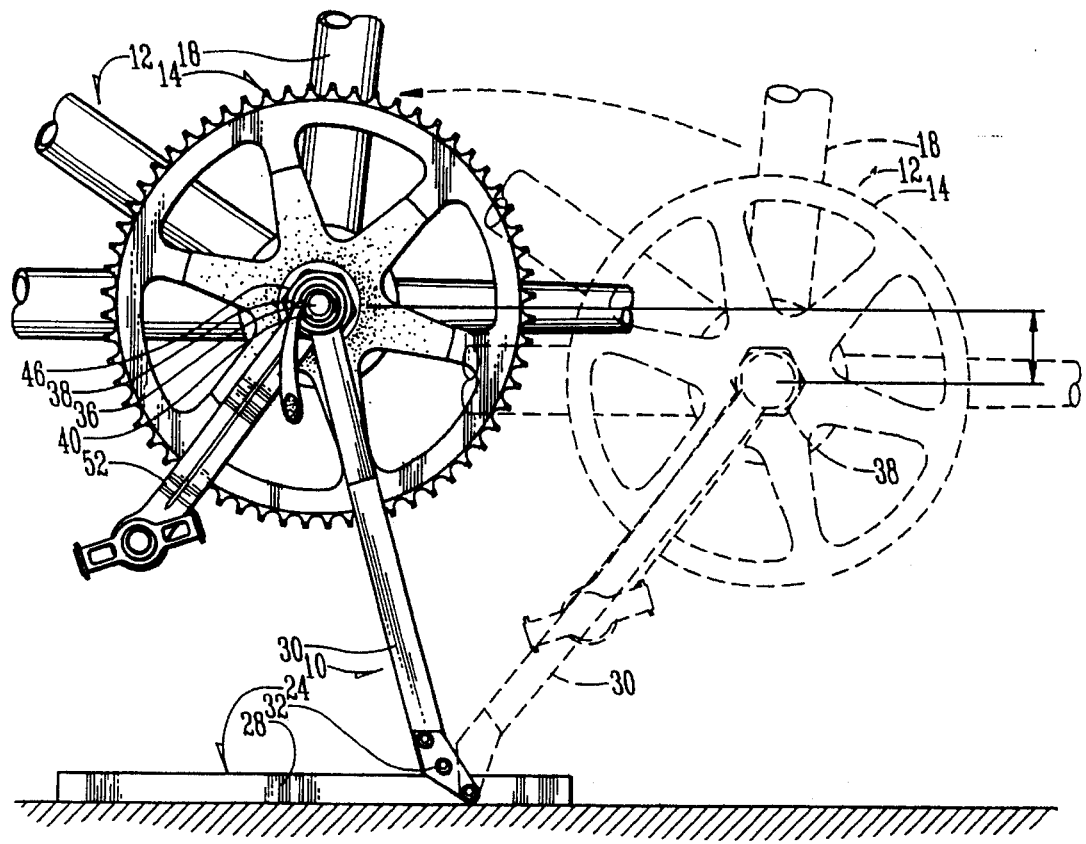
FIG. 3 is a side elevational view taken along line 3—3 of FIG. 2, and showing the stand post being pivoted from a dash line first position to a solid line position where the bicycle wheel is raised off the ground.

The stand 10 includes a base 24 which is U-shaped with oppositely disposed legs 26 interconnected by a cross piece 28. An upright post 30 is pivoted through a bolt connection 32 to the base 24 as seen in FIG. 3. The post is pivotable from a first position illustrated by the dash lines in FIG. 3 wherein the stand is mounted on the crank set 14 to a second position shown in solid lines wherein the rear wheel 22 of the bicycle is raised off the ground.

The upper end of the post 30 includes a stand sleeve 34 through which a lock bolt 36 extends. The lock bolt 36 is of the quick release skewer type that is typically used on the front axle of a bicycle wheel. A skewer sleeve 38 is mounted between the stand sleeve 34 and a bolt head 40. A second skewer sleeve 42 is mounted on the bolt 36 opposite the sleeve 38. The outer end of the sleeve 42 is received in a recess 44 in an adapter 46, seen in FIG. 4. The adapter 46 includes threads 48 on an outer end engagable with dust cap screw threads 50 in a crank arm 52. A fixing bolt 54 secures the crank 52 to an axle 56. It is thus seen that the crank arm 52 may be fully rotated with the wheel 22 off the ground, turning the adapter 46 and the lock bolt 36 along with the sleeves 38 and 42 relative to the stationary stand sleeve 34.

A modified alternate embodiment is shown in FIGS. 7 and 8 wherein the lock bolt 36A extends through the adapter 46A and engages the fixing bolt threads 60 in the crank arm axle 56. In this embodiment the rotation of the crank arm 52 causes the axle 56 to turn with the locking bolt 36A and the adapter 46A relative to a stationary stand sleeve 34A which has its outer end received in a recess 44A in the adapter 46A. This embodiment provides additional support between the stand 10A and the bicycle 12 but requires removal of the fixing bolt 54 seen in FIG. 4.

A third embodiment of the invention is illustrated in FIGS. 5 and 6 and involves the lock bolt 36B being operatively connected to the crank arm axle 56 (not shown) through a stand arm 70 having a clamp 72 engaging the crank arm 52. The lock bolt 36B extends through an outer sleeve 38B and the stand sleeve 34B and an inner sleeve 42B. The lock bolt 38B at its inner end extends through an outer wall 74 of the stand arm 70 and is locked thereto by a nut 76 as seen in FIG. 6. The clamp 72 includes two jaw sections 77 and 78 which are interconnected around the crank arm 52 by bolts 80. A pair of bolts 82 secure the clamp 72 to the stand arm 70 by extending through a wall 86 of clamp 78 and through a wall 88 of the stand arm 70 opposite the wall 74.

It is thus seen in this embodiment that it is unnecessary to remove the dust cap 90 as seen in FIG. 5 or the fixing bolt 54 as seen in FIG. 4. Some bicycles may have crank arm assemblies of one piece construction, making this embodiment the only choice. The clamp 72 is positioned on the crank arm 52 at a position that allows for the axis of rotation of the lock bolt 36B to be coaxial with the axis of rotation of the crank arm axle. It is seen in all three embodiments that the crank arm 52 is free to fully rotate a full 360 degrees without interference from the stand 10. Furthermore, all embodiments allow for supporting the bicycle on one side only, making it simple to mount and dismount the bicycle on the stand.

What is claimed is:

1. A bicycle stand comprising, a ground engaging base having an upwardly extending post, said post having upper and lower ends with said lower end connected to said base, lock means on the upper end of said post for operatively engaging a bicycle crank arm axle on one side of said bicycle only, to support a bicycle wheel off the ground and allow for full rotation of a bicycle crank arm relative to said stand, and said lock means having first threads adapted to threadably engage dust cover threads in said crank arm when a crank arm dust cover is removed.

2. The bicycle stand of claim 1 wherein said lock means includes second threads for threadably engaging fixing bolt threads of the bicycle crank arm axle when a fixing bolt is removed.

3. The bicycle stand of claim 1 wherein said post is pivotally connected to said base for movement between first and second positions, said lock means on said post in said second position is higher above the ground than in said first position whereby the bicycle wheel can be raised off the ground by moving said post from said first position to said second position.

4. A bicycle and stand in combination comprising, a bicycle having oppositely disposed wheels and a crank arm assembly connected by a chain means to one of said wheels, said crank arm assembly including an axle and oppositely disposed crank arms, a stand including a ground engaging base having an upwardly extending post, said post having upper and lower ends with said lower end connected to said base, a lock means on the upper end of said post for operatively engaging one of said crank arms only, for supporting said one wheel off the ground and allowing for full rotation of said one crank arm relative to said stand, and said lock means including first threads, and said crank arm assembly including dust cover threads in said one crank arm, and said lock means first threads threadably engaging said dust cover threads.

5. The bicycle stand of claim 4 wherein said axle includes fixing bolt threads, and said lock means includes second threads which engage said fixing bolt threads.

6. The bicycle stand of claim 4 wherein said post is pivotally connected to said base for movement between first and second positions, said lock means on said post in said second position is higher above the ground than in said first position whereby said one wheel can be raised off the ground by moving said post from said first position to said second position.

7. A bicycle stand comprising, a ground engaging base having an upwardly extending post, said post having upper and lower ends with said lower end connected to said base, lock means on the upper end of said post for operatively engaging a bicycle crank arm axle on one side of said bicycle only, to support a bicycle wheel off the ground and allow for full rotation of a bicycle crank arm relative to said stand, and said lock means including first threads for threadably engaging fixing bolt threads of the bicycle crank arm axle when a fixing bolt is removed.

8. A bicycle and stand in combination comprising, a bicycle having oppositely disposed wheels and a crank arm assembly connected by a chain means to one of said wheels, said crank arm assembly including an axle and oppositely disposed crank arms, a stand including a ground engaging base having an upwardly extending post, said post having upper and lower ends with said lower end connected to said base, a lock means on the upper end of said post for operatively engaging one of said crank arms only, for supporting said one wheel off the ground and allowing for full rotation of said one crank arm relative to said stand, and said axle including fixing bolt threads, and said lock means including first threads threadably engaging said fixing bolt threads.

\* \* \* \* \*